(12) United States Patent
Bernard et al.

(10) Patent No.: US 10,408,610 B1
(45) Date of Patent: Sep. 10, 2019

(54) METHOD AND SYSTEM FOR DISPLACEMENT MEASUREMENT OF SURFACES ON A MOVING VEHICLE

(71) Applicant: Hunter Engineering Company, St. Louis, MO (US)

(72) Inventors: Bruce E. Bernard, St. Charles, MO (US); Timothy A. Strege, Sunset Hills, MO (US)

(73) Assignee: Hunter Engineering Company, St. Louis, MO (US)

( * ) Notice: Subject to any disclaimer, the term of this patent is extended or adjusted under 35 U.S.C. 154(b) by 546 days.

(21) Appl. No.: 15/216,510

(22) Filed: Jul. 21, 2016

Related U.S. Application Data

(60) Provisional application No. 62/198,860, filed on Jul. 30, 2015.

(51) Int. Cl.
*G01B 11/26* (2006.01)
*G01B 11/275* (2006.01)
*G01M 17/02* (2006.01)

(52) U.S. Cl.
CPC ....... *G01B 11/2755* (2013.01); *G01M 17/027* (2013.01)

(58) Field of Classification Search
CPC .................. G01B 11/2755; G01M 17/027
USPC ..................................... 356/139.09
See application file for complete search history.

(56) References Cited

U.S. PATENT DOCUMENTS

| | | | |
|---|---|---|---|
| 4,123,023 A | 10/1978 | Nelson | |
| 4,153,131 A | 5/1979 | Sakata et al. | |
| 4,341,021 A | 7/1982 | Beissbarth | |
| 4,745,469 A | 5/1988 | Waldecker et al. | |
| 4,863,266 A | 9/1989 | Masuko et al. | |
| 4,899,218 A | 2/1990 | Waldecker et al. | |
| 5,220,399 A | 6/1993 | Christian et al. | |
| 5,268,731 A | 12/1993 | Fuchiwaki et al. | |
| 5,532,816 A | 7/1996 | Spann et al. | |
| 5,600,435 A | 2/1997 | Bartko et al. | |
| 5,731,870 A | 3/1998 | Bartko et al. | |

(Continued)

FOREIGN PATENT DOCUMENTS

| | | |
|---|---|---|
| JP | 63094103 | 4/1988 |
| JP | 11120480 | 4/1999 |

(Continued)

OTHER PUBLICATIONS

Expert Solutions—Automotive Industry, pp. 1-4, 2009, Keyence Corporation, Product Lit. No. MeasureExpertAuto-KA-EN0630-E 1034-4, Japan.

(Continued)

*Primary Examiner* — Mark Hellner

(74) *Attorney, Agent, or Firm* — Sandberg Phoenix & von Gontard, P.C.

(57) ABSTRACT

A vehicle measurement station utilizing an array of displacement sensors disposed on each opposite side of a sensing region of a vehicle inspection lane to acquire displacement measurement data and surface characteristic data, associated with the surfaces of a vehicle passing through the sensing region, from which vehicle components such as body panels, tire, and wheels can be identified, and from which vehicle parameters such as velocity, wheel assembly dimensions, and wheel assembly spatial orientations can be determined.

17 Claims, 6 Drawing Sheets

(56) References Cited

U.S. PATENT DOCUMENTS

| | | | |
|---|---|---|---|
| 5,793,492 | A | 8/1998 | Vanaki |
| 5,812,256 | A | 9/1998 | Chapin et al. |
| 5,818,574 | A | 10/1998 | Jones et al. |
| 5,978,077 | A | 11/1999 | Koerner et al. |
| 6,151,562 | A | 11/2000 | Merrill |
| 6,412,183 | B1 | 7/2002 | Uno |
| 6,545,750 | B2 | 4/2003 | Roth et al. |
| 6,559,936 | B1 | 5/2003 | Colombo et al. |
| 6,657,711 | B1 | 12/2003 | Kitagawa et al. |
| 6,748,796 | B1 | 6/2004 | Van Den Bossche |
| 6,894,771 | B1 | 5/2005 | Dorrance et al. |
| 7,177,740 | B1 | 2/2007 | Guangjun et al. |
| 7,336,350 | B2 | 2/2008 | Dorrance et al. |
| 7,454,841 | B2 * | 11/2008 | Burns, Jr. .......... G01B 11/2509 33/203.18 |
| 7,774,946 | B2 | 8/2010 | Boni et al. |
| 7,797,995 | B2 * | 9/2010 | Schafer .................. B60C 11/24 73/146 |
| 7,864,309 | B2 | 1/2011 | De Sloovere et al. |
| 8,107,062 | B2 | 1/2012 | De Sloovere et al. |
| 8,171,783 | B2 * | 5/2012 | Tracy .................... G01M 17/02 73/146 |
| 8,724,123 | B2 * | 5/2014 | Seifert .................. G01B 5/008 356/635 |
| 8,836,764 | B2 * | 9/2014 | Gruetzmann ........ G01B 11/275 348/46 |
| 9,377,379 | B2 | 6/2016 | Lee |
| 2003/0094039 | A1 | 5/2003 | Poulbot |
| 2003/0142294 | A1 | 7/2003 | Jackson et al. |
| 2006/0090356 | A1 | 5/2006 | Stieff |
| 2006/0152711 | A1 | 7/2006 | Dale, Jr. et al. |
| 2006/0274302 | A1 * | 12/2006 | Shylanski .......... G01B 11/2755 356/139.09 |
| 2007/0044537 | A1 | 3/2007 | Knox |
| 2007/0124949 | A1 | 6/2007 | Burns et al. |
| 2010/0180676 | A1 | 7/2010 | Braghiroli et al. |
| 2011/0102779 | A1 * | 5/2011 | De Sloovere .......... G01B 11/25 356/139.09 |
| 2013/0158777 | A1 | 6/2013 | Brauer et al. |
| 2014/0129076 | A1 | 5/2014 | Mouchet et al. |
| 2014/0253908 | A1 | 9/2014 | Lee |
| 2014/0310967 | A1 | 10/2014 | Nagornov |
| 2015/0059458 | A1 * | 3/2015 | Lee .................... G01B 11/2755 73/115.07 |
| 2015/0219785 | A1 | 8/2015 | Tudor et al. |

FOREIGN PATENT DOCUMENTS

| | | |
|---|---|---|
| JP | 5371299 B2 | 12/2013 |
| WO | 2014134719 A1 | 9/2014 |
| WO | 2014151666 A1 | 9/2014 |

OTHER PUBLICATIONS

Sensing Solutions—Automotive Industry, pp. 1-12, 2005, Keyence Corporation, Product Lit. No. SS05S-AUTO-KA-L-E 0085-1, Japan.

CCD Laser Displacement Sensor General Catalog LK-G Series, pp. 1-22, 2006, Keyence Corporation, Product Lit. No. LKG-KA-C3-E 0076-1, Japan.

CCD Laser Displacement Sensor General Catalog LK-G Series, pp. 1-22, 2006, Keyence Corporation, Product Lit. No. LKG-WW-C3-E 0096-1, Japan.

K. De Sloovere, W. Pastorius, Ph.D, Wheel Alignment Goes 3-D, pp. 1-5, Nov. 5, 2010, Quality Digest Magazine, www.qualitydigest.com.

X-3Dprofile—Dürr Reinvents Wheel Geometry Measurement, pp. 1-2, 2007, Dürr Assembly Products, www.durr.com.

Optima Laser Distance Sensor, pp. 1-2, 0312004, BS2 Multidata GmbH, www.bs-multidata.com.

Sidis 3D-CAM Wheel Alignment Benches With Innovative Measuring System, pp. 1-8, 2010, Siemens AG, Germany.

Banalogic, Fastlign—The Gold Standard in Vehicle Alignment and Tracking Verification, Banalogic Corp. product literature, pp. 1-4, Oct. 2013, Raleigh, USA.

* cited by examiner

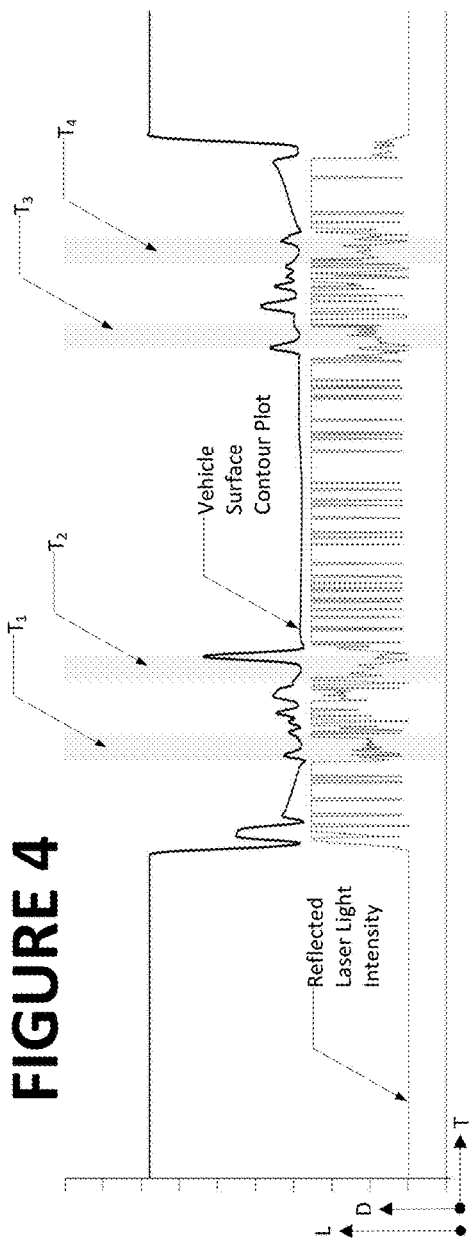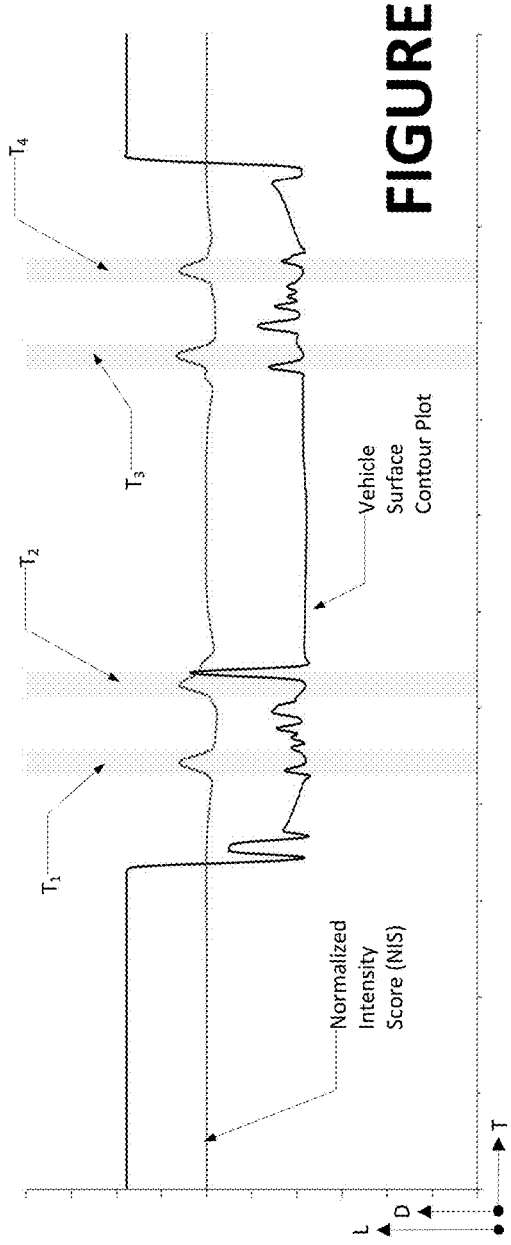

METHOD AND SYSTEM FOR DISPLACEMENT MEASUREMENT OF SURFACES ON A MOVING VEHICLE

CROSS-REFERENCE TO RELATED APPLICATIONS

The present application is related to, and claims priority from, U.S. Provisional Patent Application Ser. No. 62/198,860 filed on Jul. 30, 2015, and which is herein incorporated by reference.

STATEMENT REGARDING FEDERALLY SPONSORED RESEARCH

Not Applicable.

BACKGROUND OF THE INVENTION

The present application is related to vehicle measurement or inspection systems, and in particular, to a vehicle inspection or measurement system configured to utilize displacement sensors to acquire measurement data associated with various surfaces on a vehicle as the vehicle moves through a vehicle inspection lane, and to identify specific features of the vehicle from the acquired measurement data.

Vehicle wheel alignment systems have utilized a variety of techniques for non-contact measurement of stationary vehicle wheel assembly parameters, from which vehicle wheel alignment angles can be determined. For example, by utilizing multiple displacement measurement sensors, displacement measurements between known sensor locations and multiple locations on a stationary vehicle wheel assembly can be measured. Processing acquired measurements from displacement sensors observing wheels on opposite sides of an axle can identify planes parallel to the wheel assembly surfaces, from which representations of total toe and camber angles for the vehicle can be determined. In other configurations, two-dimensional images of a stationary vehicle wheel assembly can be acquired, and image processing algorithms utilized to identify geometric features such as the wheel rim edge, from which a perspective analysis can be performed to determine estimates of vehicle wheel assembly spatial position and orientation. Alternatively, structured light patterns, such as multiple laser lines, or colored stripes, can be projected onto a stationary wheel assembly surface and observed by an imaging system. Deviations in the projected pattern are analyzed to generate representations of the illuminated surfaces, from which vehicle wheel assembly spatial position and orientation can be estimated. These systems generally require the vehicle to remain stationary relative to the sensors during the measurement acquisition procedure, but some non-contact measurement systems require either the wheel assembly or the sensors be rotated about a stationary axis of rotation during the measurement acquisition procedure in order to obtain sufficient measurement data.

A few measurements systems are configured to acquire measurements as a vehicle wheel assembly is both rotated and translated past the sensors, i.e., as the vehicle is moved past the sensors. For example, using a laser displacement sensor to measure a distance between a fixed sensor and various points on a vehicle wheel assembly as a vehicle is driven past the sensor at a slow speed, enables a non-contact system to acquire measurement data along a horizontal slice of the wheel assembly, from which an approximation of the wheel spatial orientation can be derived. These types of non-contact systems are highly influenced by the speed at which the vehicle travels between the individual sensors, the angle (straightness) of vehicle travel relative to the sensor observation axis, suspension movement, surface features of the wheel assembly at the point of measurements (i.e., tire lettering, bulges, runout, valve stems, etc.) and changes in steering of the vehicle as it passes the sensor. Measurements acquired from a moving vehicle are useful to provide a vehicle service quick check or audit inspection, capable of identifying vehicles which may be in need of a further, more precise, alignment inspection and/or adjustment.

Accordingly, it would be beneficial to the vehicle service quick check or inspection industry if additional vehicle measurements could be acquired as the vehicle is driven, such as by a customer, through a sensing region of a vehicle inspection lane, and if variations in vehicle speed, steering, suspension movement, or direction of travel could be identified and/or accounted for during the acquisition of measurements associated with the moving vehicle.

It would be further advantageous to provide a method by which the acquired measurements could be evaluated to identify specific features of the vehicle based on the contours of observed surfaces which move past the measurement sensors.

BRIEF SUMMARY OF THE INVENTION

Briefly stated, the present disclosure sets forth a vehicle measurement system which utilizes an array of displacement sensors disposed in sensor units on opposite sides of a sensing region in a vehicle inspection lane to acquire a set of displacement measurements associated with the side surfaces of a moving vehicle passing through the sensing region. Distance data along one or more measurement axes is acquired independently by each of the displacement sensors to measure corresponding distances between the sensor and points on a surface of the vehicle as it passes through the sensing region. A processing system is configured to receive and evaluate the set of displacement measurements, together with known parameters of the measurement system, to identify vehicle features, such as body panels, wheel assemblies, and tire surfaces and to calculate vehicle parameters such as vehicle velocity, wheel rim or tire dimensions, and wheel assembly spatial orientations.

In an embodiment of the present disclosure, a vehicle measurement system is configured to process a set of displacement measurements associated with a lateral side of a vehicle passing through a sensing region to identify distance measurements acquired at the peak leading and trailing tire sidewall bulges for each vehicle wheel assembly. A processor within the vehicle measurement system is configured with software instructions to receive the set of displacement measurements, and to apply a tire bulge detection algorithm to identify distance measurements acquired from the leading and trailing tire sidewall bulges and the peak point (i.e., minimum distance) associated with each identified bulge. The tire bulge detection algorithm is a cross-correlation detection routine which is provided with an initial kernel which is representative of the shape of a tire bulge surface. The algorithm convolves the initial kernel with a depth profile of the vehicle lateral side surface obtained from the acquired distance measurements, and identifies segments which are best matches for the leading and trailing tire bulges for the front and rear wheel assemblies of the vehicle on that lateral side. Each identified segment is further evaluated to select a corresponding peak point (i.e., point having the minimum distance measurement to the observing sensor), which can be further utilized to determine one or more parameters of the vehicle, such as velocity, wheel dimensions, and total toe for an axle when combined with data from the wheel assembly on the opposite side of the vehicle.

In an embodiment of the present disclosure, a vehicle measurement system is configured to utilize an optical imaging system to acquire images of a projected laser spot on the lateral surfaces of a vehicle as the vehicle passes through a sensing region. A processor within the vehicle measurement system is configured with software instructions to evaluate the acquired images for displacement data and to extract additional data representative of one or more characteristics of the observed laser spot, such as the intensity of the reflected light or the size of the observed illuminated spot. The extracted additional data is evaluated to identify different material surfaces of the vehicle onto which the laser spot has been projected based on the observed characteristic of the laser spot in the acquired images. Changes in the observed characteristic of the laser spots in the acquired images can be correlated with the laser spots transitioning from a vehicle body panel surface onto the surfaces of a vehicle wheel assembly, such as a rubber tire, as the vehicle passes through the sensing region. By identifying different material surfaces of the vehicle onto which the laser spot has been projected, selection of specific vehicle features for further measurement can be facilitated, such as the rubber tire sidewall surfaces on wheel assemblies of the passing vehicle.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 4 illustrates a plot of laser spot intensity together with displacement data along a vehicle sidewall surface contour for a single laser spot within a displacement sensor system;

FIG. 5 illustrates calculated changes in laser spot intensity which are representative of laser light reflected from tire rubber surfaces in the vehicle sidewall surface contour of FIG. 4;

Figure 1:
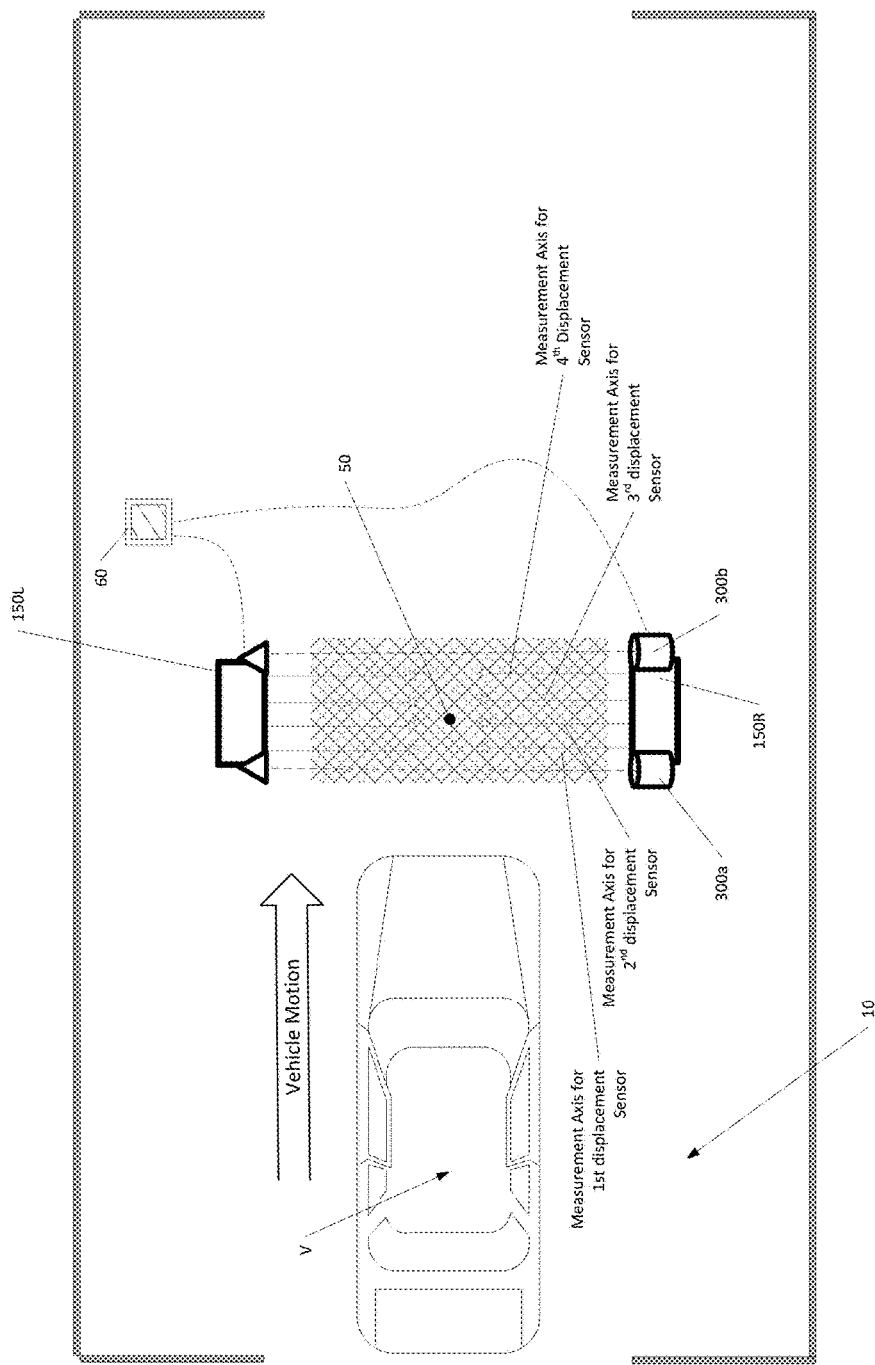
FIG. 1 is a top plan view of a vehicle inspection lane, illustrating an exemplary configuration and placement location for sensor arrays of the present disclosure in a drive-through configuration.

Corresponding reference numerals indicate corresponding parts throughout the several figures of the drawings. It is to be understood that the drawings are for illustrating the concepts set forth in the present disclosure and are not to scale. Before any embodiments of the invention are explained in detail, it is to be understood that the invention is not limited in its application to the details of construction and the arrangement of components set forth in the following description or illustrated in the accompanying drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The term "axle", as used herein, is intended to refer to a pair of vehicle wheel assemblies, each consisting of a wheel rim and a tire, disposed on opposite lateral sides of the vehicle, and which are generally axially aligned with respect to each other, such as the left and right front wheels or the left and right rear wheels. The pair of vehicle wheel assemblies may be, but are not limited to, wheel assemblies coupled by a solid interconnecting axle shaft, by a pair of half-shafts coupled through a differential, those which are partially independent of each other, or those which are fully independent of each other.

Since the present application describes features which exist on opposite lateral sides of a vehicle inspection lane, but which are otherwise identical, it will be understood that the use of the reference designations Left and Right, or L and R as in the Figures, identify corresponding components utilized at locations relative the left and right lateral sides of a vehicle or vehicle inspection lane. For example, a sensor unit described generically as 150 will be designated as 150R and 150L when specifically shown or described at either the right or left side of the vehicle inspection lane 10.

A vehicle measurement system of the present disclosure is intended for use in a vehicle service shop drive-through configuration, where a moving vehicle V is driven through a sensing region 50 within the vehicle service or inspection lane 10, as seen in FIG. 1, in a generally straight line (but not necessarily along, or parallel to, a longitudinal midline of the vehicle service or inspection lane 10), while being observed by an array of sensors acquiring measurement data, and optionally, acquiring vehicle-associated still-frame or motion video images.

The array of sensors provides an operator with an initial diagnostic overview of the moving vehicle V with minimal operator interaction, and may include displacement sensors for acquiring data related to vehicle wheel alignment, drive-over tire tread depth sensors for measuring tire wear conditions, and tire pressure measurement sensors for measuring tire inflation conditions. Machine vision systems (i.e., still frame or video cameras) may be included to acquire images of vehicle body panels for recording damage or misalignment, for observing tire sidewall markings to identify tire parameters, and/or for capturing vehicle identifying information such as license plate data. Depending upon the configuration of the sensors observing the moving vehicle V in the sensing region 50, an operator may be provided, at an operator console 60 or other remote terminal, with a detailed report on the condition of multiple components of the vehicle V, such as alignment conditions, tire wear conditions, tire pressure measurements, recalled vehicle and customer records, and recommended service and replacement parts without the need to manually identify, record, or retrieve any data.

In one embodiment, an inspection system is provided for capturing data associated with a moving vehicle V, such as with the individual wheel assemblies on each axle as the vehicle passes through an inspection lane 10. Within the system, one or more sensor assemblies or units 150, each containing at least one displacement sensor 200 are disposed on each lateral side of the sensing region 50 to observe opposite sides of the vehicle V moving through the inspection lane 10. Each sensor unit 150 is contained either within an enclosure positioned on a floor surface in proximity to the drive-through sensing region 50, within a wall-mounted housing, within a surface or flush-mount configuration, or within a combination thereof suitable for mounting one or more displacement sensors 200 and their associated components to observe the sensing region 50. Each displacement sensor 200 is associated with an operational range within which the displacement sensor 200 is capable of measuring, to within a desired tolerance, a distance to an observed surface. Given the wide variation in configurations of vehicles V, each displacement sensor 200 is preferably disposed spatial proximity to the vehicle inspection area such that the observed surfaces on an intended collection of vehicle configurations will pass by the sensor within the associated operational ranges.

Data from each displacement sensor 200 is conveyed to a processing system (local or remote) configured with suitable software instructions to control an array of sensors 200, receive data therefrom, analyze the received data, receive operator input, and convey resulting measurements to an output such as an operator console 60, a printed report, storage in a machine-readable database, or communication over a network to a remote vehicle service system or software application. The processing system is a computer system associated with a specific set of sensor units 150 forming a vehicle measurement or inspection system, or is a server system configured to communicate with multiple sets of sensor units 150 forming two or more independent vehicle measurement or inspection systems. Communications between the various sensor units 150 and the processing system is via any conventional data transmission means, such as wired networks, wireless networks, or any combination thereof.

In an exemplary configuration, each array of displacement sensors 200 consists of a support framework positioned and configured as necessary to mount two or more laterally spaced displacement sensors 200. Provisions may be included within the support framework for additional displacement sensors 200 or other types of sensors, as required. Each individual laser displacement sensor 200 includes an imaging sensor 202 having a field of view FOV to receive reflected light from a surface illuminated by at least one associated laser emitter 204 or other associated light source. Preferably, a set of two or more laser emitters 204 are aligned in a vertically spaced arrangement on a support stand 206 together in a fixed relationship with the imaging sensor 202. In one embodiment, illustrated in FIG. 2, a total of four vertically spaced laser emitters 204 are associated with a single imaging sensor 202. Greater or smaller numbers of laser emitters 204 may be employed without departing from the scope of the present disclosure, depending upon the amount of displacement measurement data to be collected for processing and averaging. The known or determinable vertical spacing between each laser emitter 204 may be uniform, varied, or symmetric. Each laser emitter 204 is configured to project a laser beam 208, preferably parallel to the ground G or vehicle support surface, onto surfaces of the vehicle V passing through the field of view FOV of the associated imaging sensor 202, such that reflected laser light 210 from the surfaces is received on a pixel array 205 of the associated imaging sensor 202 after passing through an appropriate focusing lens or optical system. Reflected laser light 210 from the surfaces observed at the associated imaging sensor 202 is used to triangulate the incident point of reflection relative to the observing imaging sensor 202 and associated laser emitter 204.

Those of ordinary skill in the art will recognize that additional laser emitters 204 may be utilized to project a plurality of parallel laser beams (for example, defining a grid of illuminated points on the surface of an observed object) which are subsequently reflected onto the pixel array 205 of the associated imaging sensor 202 without departing from the scope of the present disclosure. As a vehicle V moves past the individual laser displacement sensor 200 each laser beam 208 will intersect the moving vehicle V surfaces at a different vertical elevation, such that the reflected laser light 210 from each beam is tracked along an associated horizontal contour on the side surfaces of the vehicle V by the vehicle movement, facilitating corresponding contour plots of displacement as seen in FIG. 3.

With the laser emitters 204 arranged in an aligned and vertically stacked configuration, the data acquired from the observing imaging sensor 202 can be limited to pixel data from a narrow sub-window of pixels within the imaging sensor 202 which are aligned with the reflected light from the vertically spaced array of projected laser beams 204. Limiting the region-of-interest in the imaging sensor pixel data facilitates data compression, ignores illumination from surfaces outside of a defined region of interest, and increased data transfer rates from the imaging sensor 202 to an associated processing system.

Changes in the reflected light corresponding to laser spot intensity or laser spot size observed by the light-sensing pixel array 205 may optionally be analyzed to identify characteristics of the reflecting surface, such as material type, reflectivity, or transparency. The established relationship of the laser beams 208 to each other, i.e., horizontally displaced, vertically displaced, or both horizontally and vertically displaced relative to a reference plane, such as the ground G or vehicle support surface, compared with the observed positions of the reflected laser spots 210 on the light-sensing pixel array 205 provide additional information about the illuminated surfaces. This additional information may include, but is not limited to, an angular orientation between the observed surface and the ground G, or the motion of the observed surface relative to the ground G.

Each displacement sensor system 200 within a sensor unit 150 acquires displacement measurements associated with an observed set of spaced points or location on the side surfaces of a passing vehicle V. A collection of displacement measurements from multiple points or locations on the side surfaces of a passing vehicle V is evaluated using a variety of techniques to obtain average measurements, to discard outlier measurements, and optionally to detect and identify characteristics of vehicle movement which might influence the measurements. Such characteristics of vehicle movement may include, but are not limited to, changes in vehicle velocity (braking or accelerating), oscillations in the vehicle suspension (such as from driving over elevation changes in an inspection lane floor surface), and steering changes as the vehicle V passes through the vehicle inspection lane 10. Additional factors which may influence acquired measurements include, but are not limited to, wheel assembly runout, tire sidewall raised letter or features, and tire sidewall non-uniformity.

During operation, displacement measurements of the surfaces on a moving vehicle V passing through an inspection lane 10 or sensing region 50 can be triggered in a variety of ways. For example, as shown in FIG. 1, one or more optical triggers 300a, 300b can be disposed across the path of vehicle travel, such that an optical trigger beam is interrupted by the passage of the vehicle, triggering the acquisition of displacement measurements by each displacement sensor 200, as well as measurements or data acquisition by other associated sensors. If the optical triggers 300a and/or 300b are placed below the level of the vehicle body panels, the trigger beams will be interrupted by the passage of the wheel assemblies on each axle of the vehicle V, providing an indication of specific periods of time during which displacement measurements can be acquired from the wheel assembly surfaces. Alternatively, if the optical triggers 300a and/or 300b are placed vertically higher, the trigger beams will be interrupted by the vehicle body panels, and provide an indication of the specific period of time during which the vehicle V is passing through the inspection lane 10 or sensing region 50. If multiple triggers 300a and 300b are provided, the sequence and frequency of the interruptions may be utilized to identify the presence of a vehicle V (as distinguished from a human operator walking past), the number of axles present on a vehicle V, the velocity of the vehicle V, any change in acceleration of the vehicle V within the sensing region 50 (or between the spaced triggers), and when the vehicle V has exited the sensing region 50 such that measurement acquisition can be terminated.

Figure 2:
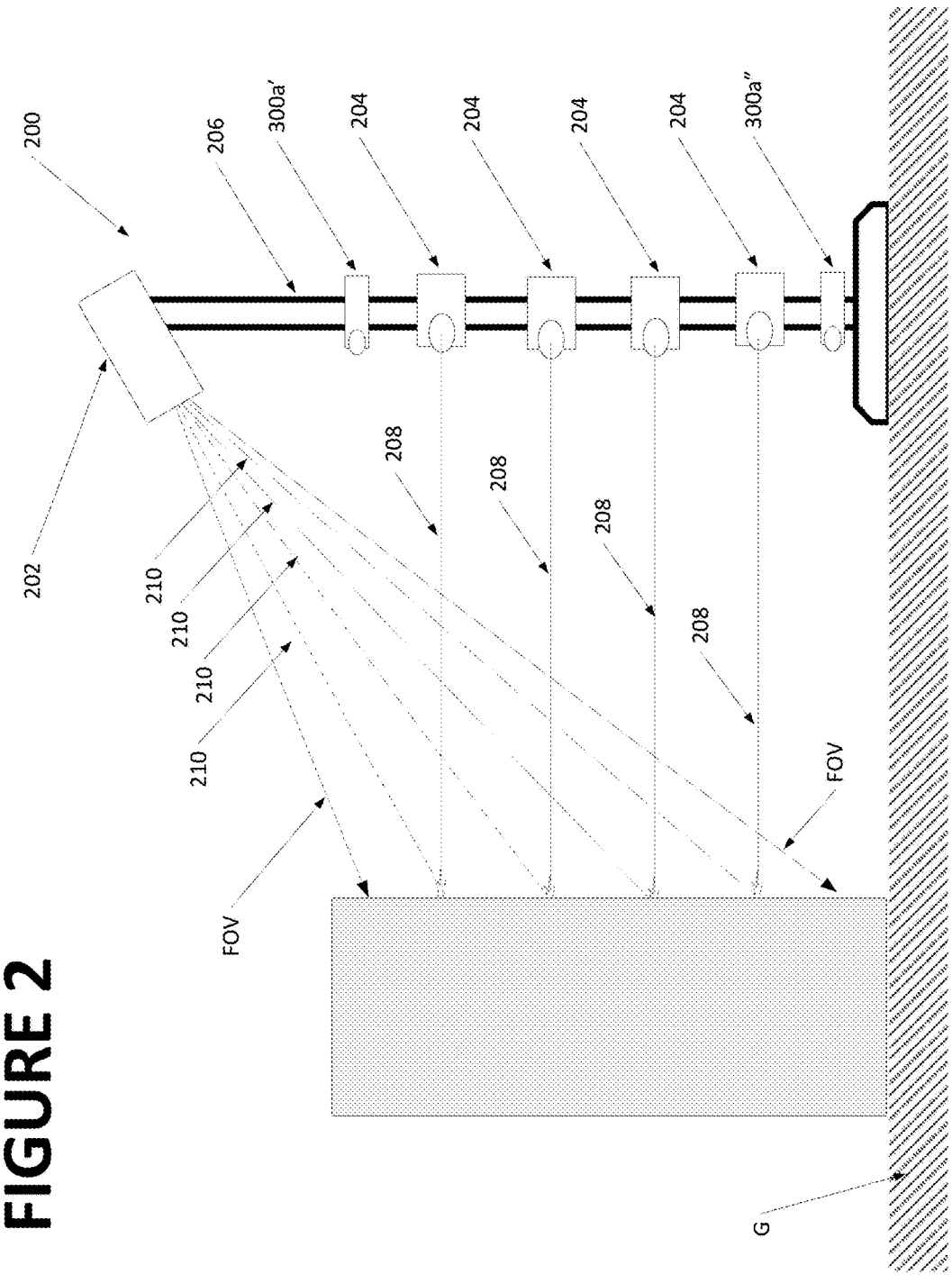
FIG. 2 is a side view of a single displacement sensor system within a sensor array of FIG. 1.
Figure 3A:
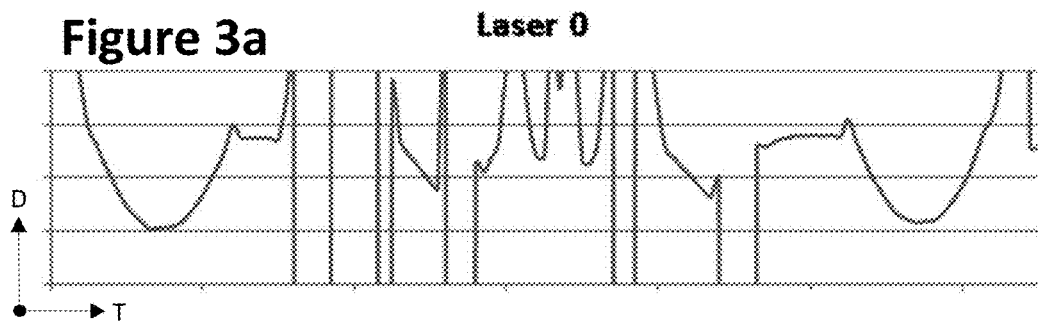
FIGS. 3*a*-3*d* illustrate an exemplary set of contour lines obtained across a vehicle wheel assembly from lasers 0-3 of a single displacement sensor system within a sensor array of FIG. 1.
Figure 3B:
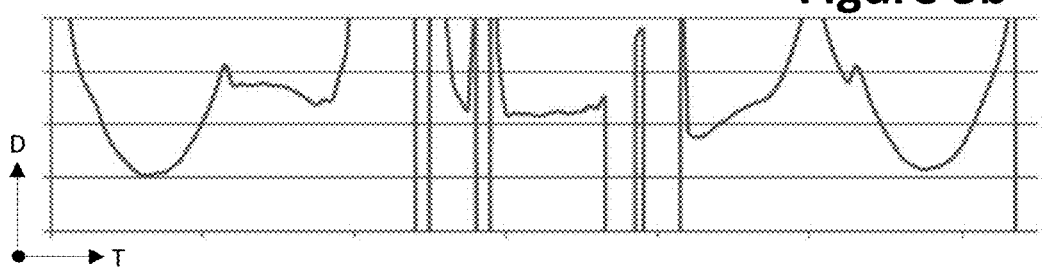
Figure 3C:
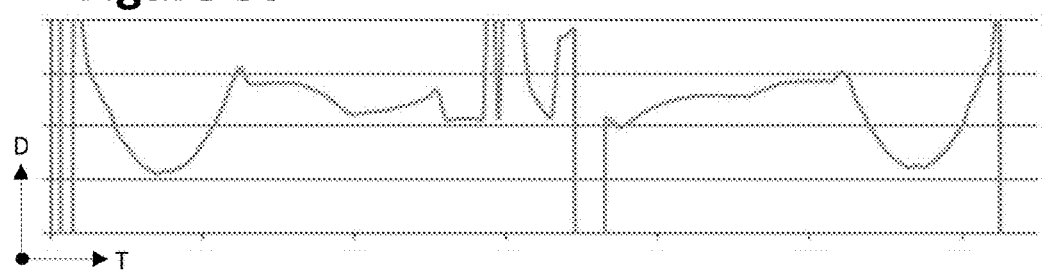
Figure 3D:
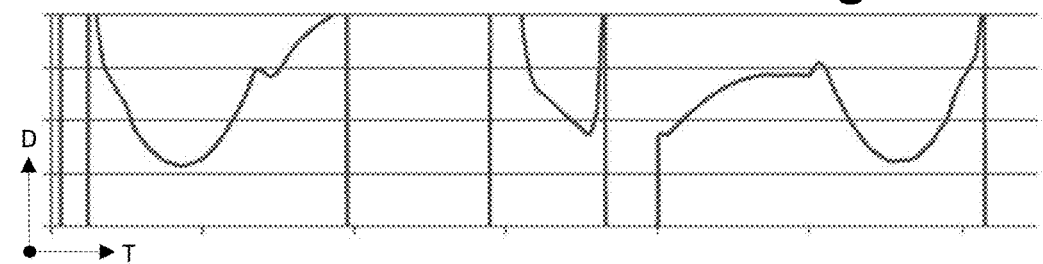

For example, in an inspection lane 10 through which multiple vehicles V will pass in quick succession, utilizing a first optical trigger 300a' at a height suitable for interruption by the vehicle body, together with a second optical trigger 300a", at a height suitable for interruption by the vehicle wheel assemblies, as shown in FIG. 2, aids in distinguishing between back-to-back vehicles V and associating displacement measurements acquired from the wheel assemblies on individual axles with specific vehicles. The first optical sensor 300a' is interrupted as the vehicle V enters the sensing region, identifying the presence of the vehicle V. As the vehicle V moves through the sensing region 50, the second optical sensor 300a" is alternately blocked and unblocked by the wheel assemblies on each axle. So long as the first optical sensor 300a' remains interrupted by the vehicle V, the blocking and unblocking of the second optical sensor 300a" is associated with axles on the current vehicle V. When the first optical sensor 300a' is unblocked as the vehicle V departs the observation area, the axle association from the second optical sensor 300a" is reset, and the system is ready to receive the next vehicle V in succession.

Turning to FIGS. 3a-3d, plots of distance measurements acquired by a single displacement sensor 200 configured with four laser emitters, are shown over time as side surfaces of a vehicle V move past a displacement sensor 200. Distance (D) from the displacement sensor to the point of intersection for each laser beam 208 (shown as lasers 0-3) is plotted on the Y-axis against time (T) on the X-axis, such that an object close to the displacement sensor 200 will be recorded as having a small displacement, while the absence of an object within the sensor measurement range will be recorded as a peak at a maximum permissible displacement value.

Each laser emitter 204 is disposed at a different vertical height above the ground or vehicle support surface G, such that the emitted laser beams 208 intersect the vehicle side surfaces at corresponding vertical heights. Prior to the vehicle V intersecting the projected laser beams, there is no interrupting surface from which the laser beams 208 are reflected within the measurement range of the displacement sensor 200. Plotted data at this point in time, shown near the right edge of each contour in FIGS. 3a-3d is represented as the maximum displacement value. As the vehicle V moves through the sensing region 50, vehicle surfaces intersect the individual laser beams 208 of lasers 0-3. This may occur substantially simultaneously for "square" or "boxy" vehicles such as vans or trucks, or may occur at different points in time T for each laser beam 208 on vehicles having sloped, curved, or angled body panels, such as passenger cars, sports cars, etc. In general, as seen in FIGS. 3a-3d, the illumination of the vehicle side surfaces is indicated by the changes in the distances D measured to each laser illumination point. In one embodiment, the detection of an initial change in measured distance D associated with any one of the individual laser beams for lasers 0-3 can be used as a "trigger" to begin recording measurement data from all of the displacement sensors 200 with in a system 150, eliminating the need for a separate trigger system.

At some points along the vehicle V, such as at the vehicle wheel wells, or between vehicle body panels, the illuminating laser beam 208 does not intersect a vehicle surface within the measurement range of the displacement sensor 200, and the measured distances D revert to the defined maximum displacement values. At other points along the vehicle surface, reflective surfaces may skew the measured distances D to appear as peaks or spikes which protrude from the vehicle side surface towards the displacement sensor 200.

Once a collection of data points defining one or more contours along the side surfaces of a vehicle V, such as shown in FIGS. 3a-3d are acquired by a displacement sensor 200, the data is processed to identify specific features of the vehicle V, such as wheel assembly locations and tire surfaces, from which vehicle parameters can be determined. Subsets of the displacement measurement contours which are representative of a front wheel assembly or a rear wheel assembly are generally distinguishable from the portions of the contours which represent smooth vehicle body panels. As the contours trace from a leading edge of the vehicle V towards a rear edge, they capture regions of maximum displacement which are representative of the separations between vehicle body panels and the front wheel assembly, i.e., the wheel well. Additional regions of maximum or near maximum displacements are observed in the portions of the contours which trace across the complex shapes of the wheel rim, spokes, and various brake and suspension components visible through openings in the wheel rims. Between the contour regions which are representative of the wheel wells, and those which are representative of the wheel rim, are contour regions or subsets of measurements which are representative of the tire sidewall surfaces. Identifying these features with specificity, and in particular, identifying key locations on these features within each contour scan for the front and rear wheel assemblies provides the non-contact inspection system with measurements from which vehicle parameters can be determined.

Within the data points and contours of FIGS. 3a-3d are subsets of measurements which are representative of the leading and trailing tire sidewall surfaces for the measured wheel assembly. The tire sidewall surfaces are generally found adjacent to the peaks (maximum displacements) representative of the wheel wells, and are often represented as curved or arcuate regions in the measurement data. Features of the tires, such as raised lettering, rim guards, inflation pressure, and mounting on the wheel rim can render the curved or arcuate regions of the measurement data difficult to identify or distinguish from other measured data points associated with the vehicle. Failure to clearly identify or distinguish the tire sidewall features can reduce the accuracy of representative data points which are determined from the tire sidewall features, such as leading and trailing tire sidewall minimum displacement measurements for each contour line.

Several methods are available for identifying the tire sidewall feature subsets of measurement data from within the data points or contour acquired by the traversal of a single laser beam 208 across the surfaces of a passing vehicle V. On a simplistic level, the various data points can be evaluated to identify those points which are closest to the displacement sensor 202 (i.e., points which are closer than an average), and which have the characteristics of a tire sidewall surface (i.e., which are part of a smooth curve), or which lie between points which define a pair of peaks (i.e., the open wheel well regions forward and aft of the wheel assembly surfaces). Methods for identifying tire sidewall feature data which rely exclusively on displacement data can be subject to error, and can both fail to identify a tire sidewall surface, and can misidentify another surface as the tire sidewall surface.

One method of the present disclosure which facilitates identifying the tire sidewall feature subsets of measurement data from within the data points or contour acquired by the traversal of a single laser beam 208 across the surfaces of a passing vehicle V utilizes an observed characteristic of the reflected laser light 210 in addition to the measured displacement data. As seen in FIG. 4, the intensity L of the reflected laser beam at the imaging sensor is recorded and plotted together with each acquisition of a displacement measurement data D. When the laser beam 208 is reflected from a painted surface, such as a metal or plastic surface of the vehicle, the reflected light exhibits a high measure of intensity. Unobstructed laser beams 208, such as prior to the vehicle interrupting the beam, return no signal, and the measure of intensity L is essentially zero. When the laser light is reflected from the rubber sidewall surface of a tire, the measured intensity L is of a mid-range intensity, varying noticeably from that which is reflected from adjacent wheel rim and vehicle body panel surfaces, as indicated by the highlighted regions $T_{1-4}$ of FIG. 4. By calculating a normalized intensity score NIS using each measurement point of reflected laser light in an array of lasers 204, and plotting the results together with the displacement measurement data D, as seen in FIG. 5, peaks in the normalized intensity score NIS contour identify the subset of displacement measurement D points or regions $T_{1-4}$ which have a high probability of having been acquired from the tire sidewall surfaces, and may be utilized to select a set of displacement measurement points for further processing to identify the desired tire sidewall feature data.

In one embodiment, a normalized intensity score NIS for the laser intensity data acquired from a single displacement sensor array 200 at each point in time may be calculated using the observed minimum and maximum intensity values within the set of reflected laser points from that sensor array as observed at that point in time, which fall within a permissible range of 0-255. The NIS values are calculated using the following:

Min=Minimum intensity value in the set of observed laser points at time $T$;

Max=Maximum intensity value in the set of observed laser points at time $T$;

Intensity Score at time $T$=normalized [Min*(255−Max)];

It will be recognized that an intensity score value can be calculated from the reflected light from one or more of the lasers 204 in a single displacement sensor array 200 using a variety of other techniques without departing from the concepts disclosed herein, so long as technique results in an intensity score which changes in response to the characteristics of the surface from which the laser beams 208 are reflected. For example, an intensity score for a single laser point could be calculated by selecting minimum and maximum values from a sliding window of intensity values recorded for that single laser point as the vehicle V traverses past the sensor array 200.

As an alternative to an intensity score, measures of the apparent spot size of the individual reflected laser beams 210 as observed on the pixel array of the imaging sensor 202 can differentiate between various types of surfaces onto which the individual laser beams 208 of a displacement sensor array 200 are projected as a vehicle V moves through a sensing region 50. Apparent laser spot size can be utilized in substantially the same manner as the laser intensity to generate a normalized spot size score, wherein the upper limit of the permissible range is a value selected based on the properties of the optical system, and is not limited to a value of 255. The normalized spot size score of the reflected laser beam at the imaging sensor is recorded and plotted together with each acquisition of a displacement measurement data D. When the laser beam 208 is reflected from a painted surface, such as a metal or plastic surface of the vehicle, the illuminated spot is tightly constrained. Unobstructed laser beams 208, such as prior to the vehicle interrupting the beam, return no signal, and the measure of spot size is essentially zero. When the laser light is reflected from the rubber sidewall surface of a tire, the spot size increases, varying noticeably from that which is reflected from adjacent wheel rim and vehicle body panel surfaces. Spot size may be defined as a dimension, an area, or other figure of merit related to the size of the illuminated spot.

By utilizing information other than the displacement measurement data (i.e., non-distance or non-displacement information) together with the displacement measurement data acquired by the displacement sensor array 200, identification of the tire sidewall surfaces is improved, enabling greater accuracy and repeatability in identifying specific tire sidewall features, such as peak points of the tire bulge, represented by a minimum observed displacement point within the tire sidewall displacement data D. It will be readily understood that features of the tire sidewall other than the peak point of the tire bulge may be identified and utilized for various vehicle measurement purposes. For example, changes in laser intensity or illuminated spot size may be used to identify transitions between the tire rubber and a wheel rim edge, facilitating measurements of wheel rim dimensions.

Figure 6:
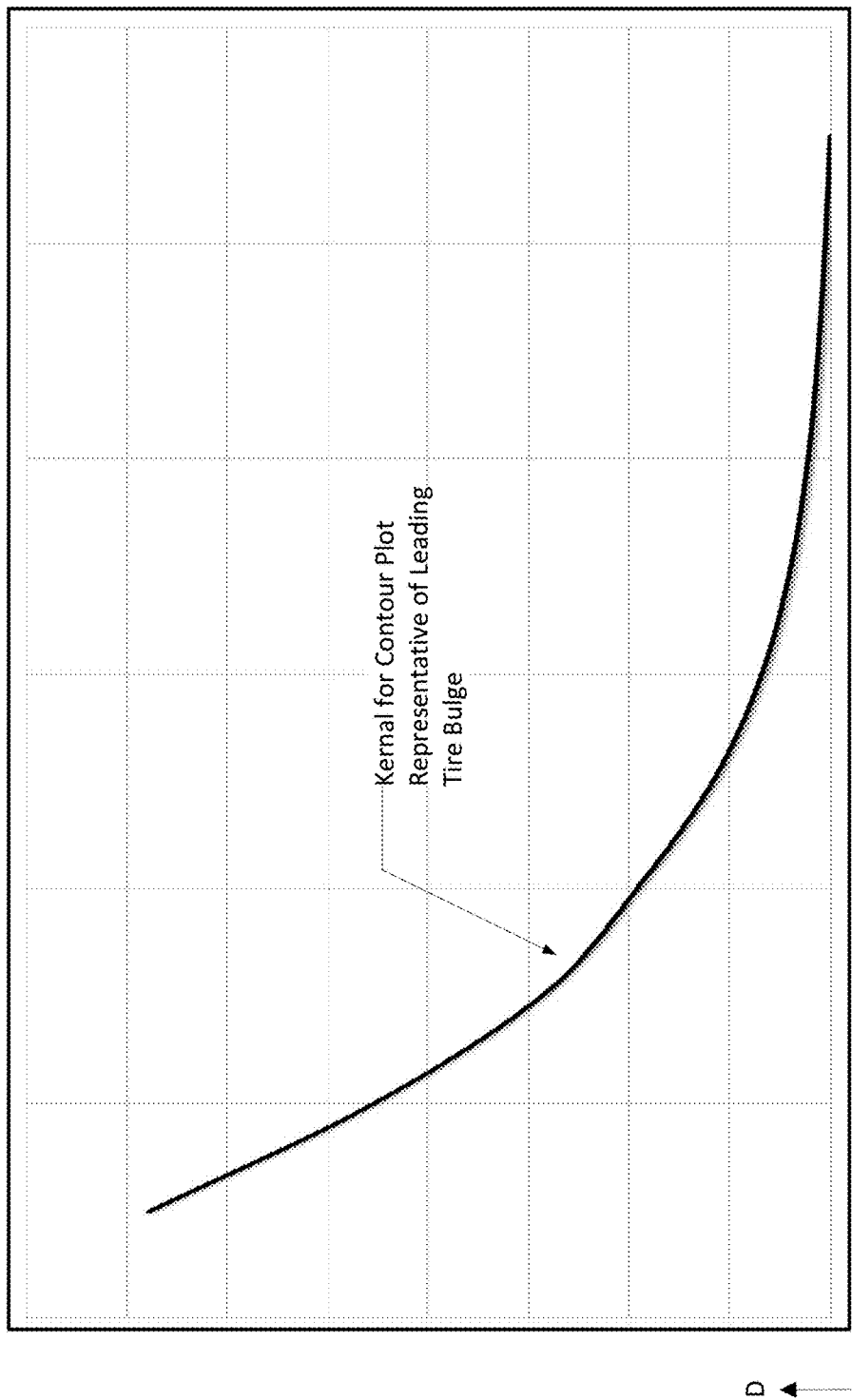
FIG. 6 illustrates a plot of a kernel representation of a leading tire sidewall bulge contour for use in a cross-correlation function.

Under some conditions, procedures utilizing non-distance information such as laser spot intensity or illuminated spot size may fail to provide sufficient information to identify a tire sidewall surface. Accordingly, a cross-correlation procedure which utilizes the acquired displacement data D may be utilized as an alternative to, or instead of, a procedure utilizing non-distance information. In one embodiment, the vehicle measurement or inspection system is configured to process a set of displacement measurements defining a vehicle surface contour plot associated with the side surfaces of a vehicle passing through a sensing region 50 to identify specific distance measurements acquired at the peak points of the leading and trailing tire sidewall bulges ($T_1$, $T_2$ and $T_3$, $T_4$) for each wheel assembly on a lateral side of the vehicle V. The processor within the vehicle measurement or inspection system is configured with software instructions to receive the set of displacement measurements, and to process the received displacement measurements using tire bulge detection algorithm to identify a subset of distance measurements acquired from the leading and trailing tire sidewall bulges together with a peak point (i.e., minimum distance) associated with each identified bulge. The tire bulge detection algorithm is a cross-correlation detection routine utilizing an initial kernel, such as shown in FIG. 6, which is representative of an expected shape of a tire bulge surface contour. This cross-correlation is similar in nature to the convolution of two functions, and is defined as:

$$(f*g)[n] \stackrel{def}{=} \sum_{m=-\infty}^{\infty} f*[m]g[m+n] \quad \text{Eqn. 1}$$

Figure 7:
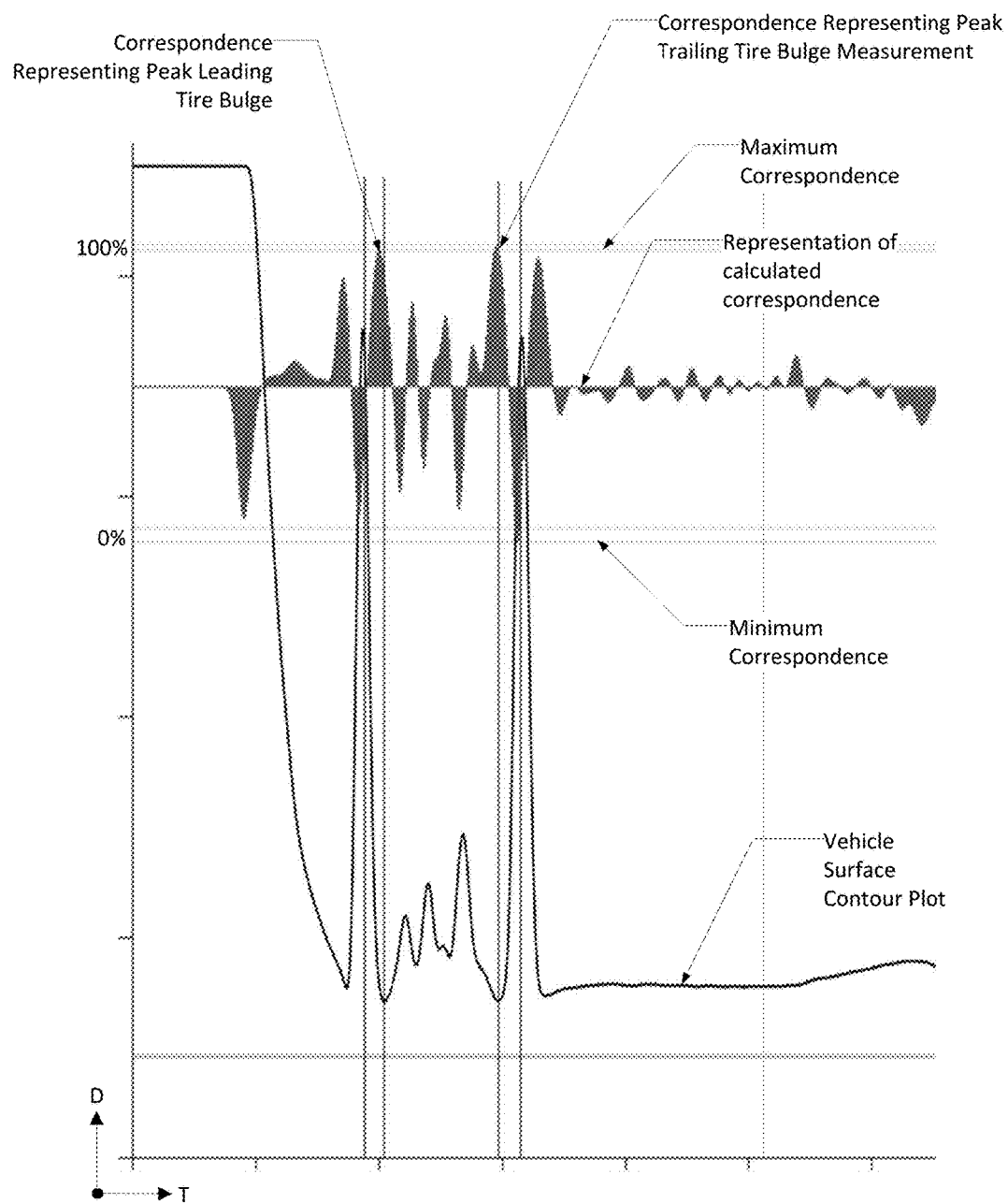
FIG. 7 illustrates a plot of displacement measurement data for a portion of a vehicle side surface including a single wheel assembly, together with the results of a cross-correlation function for identifying tire sidewall bulges.

The algorithm convolves the initial kernel, represented as a quadratic curve similar to a typical tire bulge contour, with a depth profile or contour of the vehicle side surfaces obtained from the acquired distance measurements, and identifies subsets of measurements within the depth profile or contour which are best matches for the leading and trailing tire bulges at the each wheel assembly of the vehicle. As seen in FIG. 7, the evaluation of a single contour scan of a vehicle surface in the vicinity of a front wheel, using the cross-correlation function of Eqn. 1 produces a plot representative of a degree of correlation between the single contour scan and the initial kernel. Selecting the highest peak points on the correlation plot representing the best matches identifies regions of the single contour scan which best correspond to the leading and trailing tire sidewall surfaces of one of a vehicle wheel assembly. Each identified subset of measurements in the vehicle surface contour scan is then evaluated to select a corresponding peak point (i.e. point having the minimum distance measurement to the observing displacement sensor), which can be further utilized to determine one or more parameters of the vehicle V, such as velocity, wheel dimensions, and total toe for an axle when combined with corresponding data from the wheel assembly on the laterally opposite side of the vehicle V. It will be understood that a single initial kernel may be utilized to detect both the leading and trailing tire bulge contours associated with each observed vehicle wheel, or alternatively, kernels specific to the shape of a leading tire bulge contour and to the specific shape of a trailing tire bulge contour may be utilized in multiple evaluations of the contour data if the tire bulges are sufficiently distinguishable. In a further embodiment, if the leading and trailing tire bulge contours are mirror-images of each other, a single kernel may be utilized, but reversed between evaluations of the contour data.

When a displacement sensor array 200 consisting of multiple lasers emitters 204 associated with a single imaging sensor 202 is combined into a sensor unit 150 together with one or more additional displacement sensor array 200, multiple measurements are acquired from the surfaces of a vehicle V passing through the sensor unit sensing region 50. Using various statistical analysis techniques, measurements of tire bulge peak points which vary from values or computed averages obtained across all of the displacement sensors 200 in a sensor unit 150 can be identified and discarded as outliers, and the remaining data processed to provide a statistically reliable representation of the measured vehicle characteristics. These characteristics may include individual or combined wheel orientations such as camber or total toe. A representation of vehicle velocity may be determined by averaging multiple measures of velocity obtained by determining the time taken for an identified feature on the vehicle V to pass two or more displacement sensors 200 within the sensor unit 150, given that the lateral spacing between the displacement sensors 200 is known. Determined effects of vehicle velocity on acquired measurements or determined vehicle characteristics can be identified and/or compensated for as required.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits. As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle measurement system, comprising:
 a pair of sensor units disposed in proximity to a vehicle inspection lane through which a moving vehicle passes, with one sensor unit of said pair on each opposite lateral side of said vehicle inspection lane;
 wherein each sensor unit is configured with at least one displacement sensor to acquire a plurality of distance measurements along an associated fixed measurement axis to distance measurement points on adjacent side surfaces of a vehicle moving through said vehicle inspection lane between said sensor units, and to acquire a plurality of measurements of at least one non-displacement characteristic of said adjacent side surfaces at each of said distance measurement points;
 wherein said sensor unit is operatively coupled to convey said plurality of distance measurements and said plurality of non-displacement characteristic measurements to a processing system; and
 wherein said processing system is configured with software instruction to utilize said plurality of distance measurements and said plurality of non-displacement characteristic measurements to determine at least one vehicle parameter.

2. The vehicle measurement system of claim 1 wherein said processing system is configured with software instructions to utilize said non-displacement characteristic measurement at each distance measurement point to identify, within said plurality of distance measurement points, a subset of distance measurement points associated with a vehicle wheel assembly.

3. The vehicle measurement system of claim 2 wherein said subset of distance measurement points is associated with a tire sidewall surface.

4. The vehicle measurement system of claim 1 wherein each sensor unit includes at least one displacement sensor configured to project at least one laser beam along said associated fixed axis towards said vehicle inspection lane; and wherein said plurality of non-displacement characteristic measurements are associated with light reflected from points on said vehicle side surfaces illuminated by said at least one laser beam as said vehicle moves through said inspection lane.

5. The vehicle measurement system of claim 4 wherein said plurality of non-displacement characteristic measurements are measures of reflected light intensity.

6. The vehicle measurement system of claim 4 wherein said plurality of non-displacement characteristic measurements are representative of observed sizes of illuminated spots of said laser light on said vehicle side surfaces.

7. The vehicle measurement system of claim 1 wherein each displacement sensor is configured to project at least one laser beam along said associated fixed measurement axis towards said vehicle inspection lane;

wherein said plurality of non-displacement characteristic measurements are associated with light reflected from points on said vehicle side surfaces illuminated by said at least one laser beam and vary in response to a type of material on said vehicle side surfaces from which said laser light is reflected; and wherein said processing system is configured to select said at least one measurement subset based on said variations in said plurality of non-displacement characteristic measurements.

8. The vehicle measurement system of claim 1 wherein each displacement sensor is configured to project a plurality of laser beams along associated fixed measurement axes towards said vehicle inspection lane;

wherein said plurality of non-displacement characteristic measurements are measures of light intensity associated with light reflected from a plurality of points on said vehicle side surfaces illuminated by said plurality of laser beams; and wherein said processing system is configured to calculate, in association with each sequential distance measurement, a normalized product of a minimum light intensity measurement from said plurality of laser beams and a maximum light intensity measurement from said plurality of laser beams; and wherein said processing system is further configured to utilize said normalized product values to select, within said plurality of sequential distance measurements, at least one measurement subset associated with said vehicle wheel assembly.

9. The vehicle measurement system of claim 1 wherein each displacement sensor is configured to project a plurality of laser beams along said associated fixed measurement axes towards said vehicle inspection lane;

wherein said plurality of non-displacement characteristic measurements are measures of spot size associated with light reflected from a plurality of points on said vehicle side surfaces illuminated by said plurality of laser beams;

wherein said processing system is configured to calculate, in association with each sequential distance measurement, a normalized product of a minimum illuminated spot size from said plurality of laser beams and a maximum spot size from said plurality of laser beams; and wherein said processing system is further configured to utilize said normalized product values to select, within said plurality of sequential distance measurements, at least one measurement subset associated with said vehicle wheel assembly.

10. A vehicle measurement system, comprising:

a pair of sensor units disposed in proximity to a vehicle inspection lane through which a moving vehicle passes, with one sensor unit of said pair on each opposite lateral side of said vehicle inspection lane;

wherein each sensor unit is configured to acquire a plurality of distance measurements associated with adjacent side surfaces of a vehicle moving through said vehicle inspection lane between said sensor units, and to acquire a plurality of measurements of at least one non-displacement characteristic of said adjacent side surfaces;

wherein said sensor unit is operatively coupled to convey said plurality of distance measurements and said plurality of non-displacement characteristic measurements to a processing system;

wherein said processing system is configured with software instruction to utilize said plurality of distance measurements and said plurality of non-displacement characteristic measurements to determine at least one vehicle parameter;

wherein said processing system is configured with software instructions to utilize said plurality of non-displacement characteristic measurements to select, within said plurality of distance measurements, at least one distance measurement subset associated with a vehicle wheel assembly; and wherein said processing system is configured to evaluate said measurement subsets to identify outlier measurement data.

11. The vehicle measurement system of claim 10 wherein said outlier measurement data is measurement data which deviates from a calculated average by more than an acceptable tolerance.

12. The vehicle measurement system of claim 10 wherein said processing system is further configured to exclude said identified outlier measurement data from subsequent calculations of vehicle characteristics.

13. A method for identifying displacement measurements associated with the tires of a vehicle moving through a sensing region of a non-contact displacement measurement system, comprising:

acquiring a plurality of displacement measurements associated with adjacent side surfaces of said vehicle moving through said sensing region;

for at least one displacement measurement in said plurality of displacement measurements, acquiring at least one associated measure of light intensity at a point on said adjacent side surface of said vehicle at which said associated displacement measurement is acquired;

evaluating said plurality of displacement measurements, together with each associated measure of light intensity, to select, within said plurality of distance measurements, at least one subset of measurements representative of a tire surface;

wherein said step of evaluating includes calculating an illumination intensity score associated of each of said points on said adjacent vehicle side surface, said illumination intensity score varying in relation to a material type of said adjacent vehicle side surface; and utilizing said illumination intensity scores to select said at least one subset of measurements representative of said tire surface.

14. A method for identifying displacement measurements associated with the tires of a vehicle moving through a sensing region of a non-contact displacement measurement system, comprising:

acquiring a plurality of displacement measurements associated with adjacent side surfaces of said vehicle moving through said sensing region;

for at least one displacement measurement in said plurality of displacement measurements, acquiring an associated measurement of a measure of illuminated spot size at a point on said adjacent vehicle side surface of said vehicle at which said associated displacement measurement is acquired; and evaluating said at least one associated measurement together with said plurality of displacement measurements to select, within said plurality of distance measurements, at least one subset of measurements representative of a tire surface.

15. The method of claim 14 wherein said step of evaluating said associated measurements includes calculating an illumination spot size score associated of each of said points on said adjacent vehicle side surface, said illumination spot size score varying in relation to a material type of said adjacent vehicle side surface; and utilizing said illumination spot size scores to select said at least one subset of measurements representative of said tire surface.

16. A vehicle inspection system for acquiring measurements of a vehicle moving through an inspection lane, comprising:

a non-contact measurement system configured with a plurality of displacement sensors to acquire a plurality of displacement measurements along fixed distance measurement axes to points associated with the wheel assemblies on each side of the moving vehicle;

a drive-over tire tread depth measurement system configured to acquire a plurality of measurements of tire tread depth from each wheel assembly of the moving vehicle;

at least one camera system, said camera system configured to record at least one image of an external surface on the moving vehicle; and a processing system configured to receive said displacement measurements, said tire tread depth measurements, and said at least one image of the external surface of the moving vehicle, said processing system configured with software instructions to evaluate said displacement measurements to identify at least one alignment characteristic of the vehicle, and to generate an inspection report including said at least one alignment characteristic, said at least one image of the external surface of the moving vehicle, and, for each of said wheel assemblies, a representation of said measured tire tread depth.

17. A vehicle inspection system for acquiring measurements of a vehicle moving through an inspection lane, comprising:

a non-contact measurement system configured with a plurality of displacement sensors on opposite lateral sides of said inspection lane to acquire a plurality of distance measurements along associated fixed distance measurement axes to points on horizontal contours traced along the surfaces of a vehicle moving through said inspection lane, at least one of said horizontal contours intersecting each wheel assembly on a corresponding side of said moving vehicle;

a drive-over tire tread depth measurement system configured to acquire a plurality of measurements of tire wear from each wheel assembly of the moving vehicle; and a processing system configured to receive said displacement measurements and said tire wear measurements, said processing system configured with software instructions to evaluate said displacement measurements to identify at least one alignment characteristic of the vehicle, and to generate an inspection report including said at least one alignment characteristic, and a representation of tire wear for each of said wheel assemblies.

* * * * *